March 6, 1945.  F. W. DAVIS  2,370,844
AIRPLANE CONTROL MECHANISM OF THE BOOST TAB TYPE
Filed Jan. 29, 1943  3 Sheets-Sheet 1
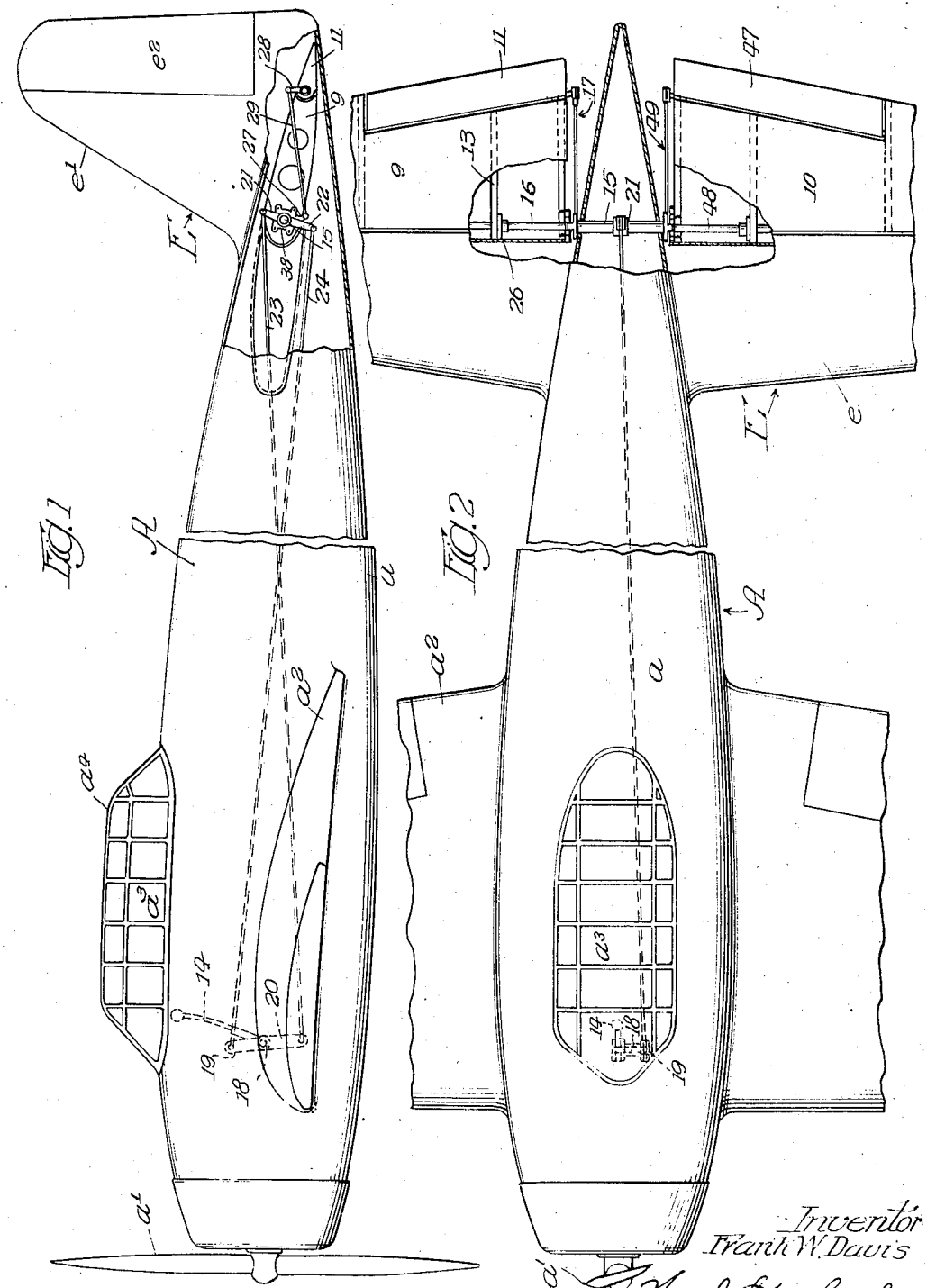

March 6, 1945. F. W. DAVIS 2,370,844
AIRPLANE CONTROL MECHANISM OF THE BOOST TAB TYPE
Filed Jan. 29, 1943 3 Sheets-Sheet 2
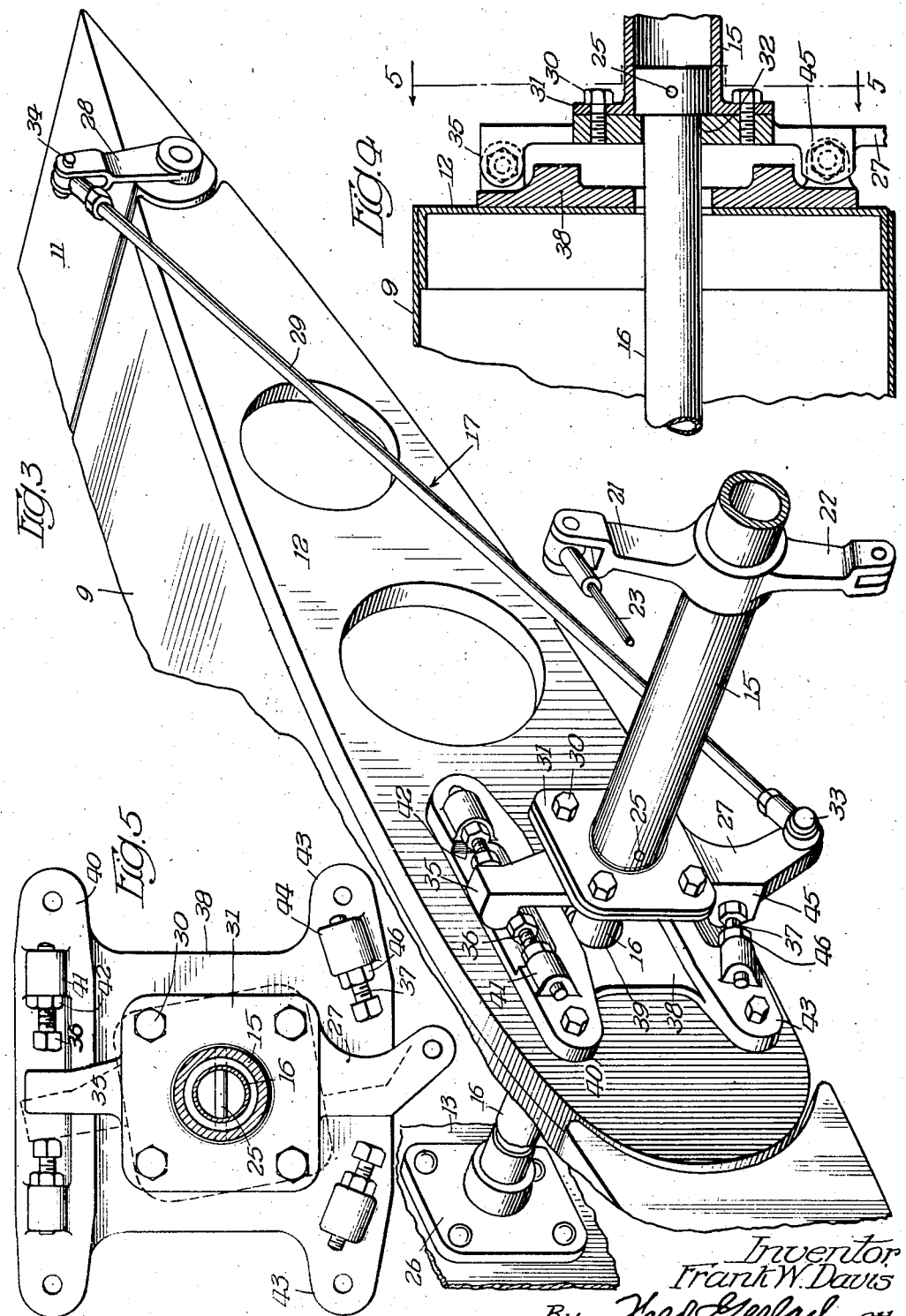
Inventor
Frank W. Davis
By Fred Gerlach Atty March 6, 1945. F. W. DAVIS 2,370,844
AIRPLANE CONTROL MECHANISM OF THE BOOST TAB TYPE
Filed Jan. 29, 1943 3 Sheets-Sheet 3
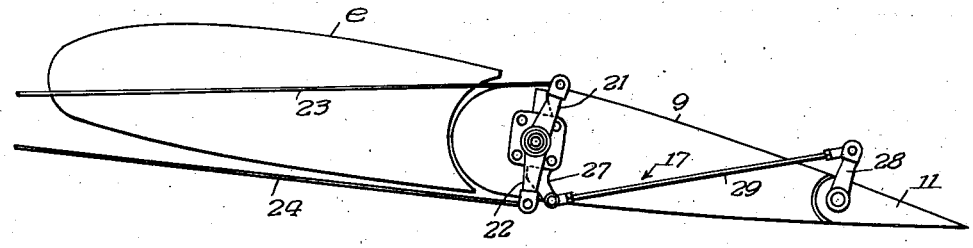
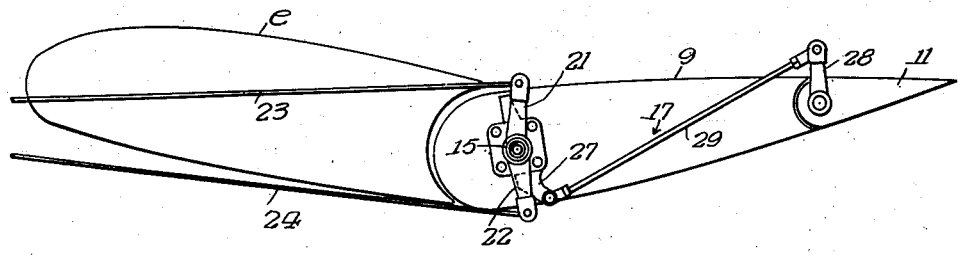
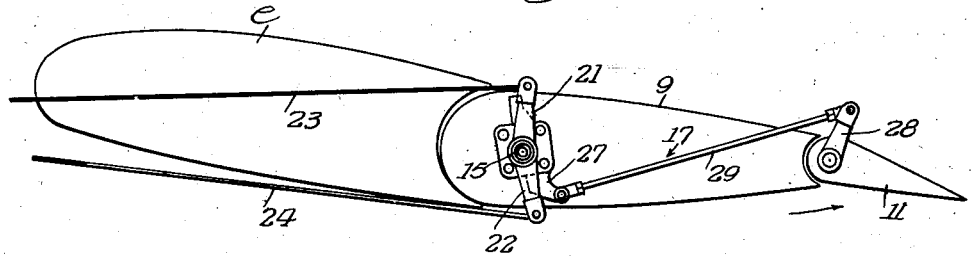
Inventor
Frank W. Davis
By Fred Gerlach, Atty.

Patented Mar. 6, 1945

2,370,844

UNITED STATES PATENT OFFICE 2,370,844

AIRPLANE CONTROL MECHANISM OF THE BOOST TAB TYPE

Frank W. Davis, Pasadena, Calif., assignor, by mesne assignments, to Consolidated Vultee Aircraft Corporation, a corporation of Delaware Application January 29, 1943, Serial No. 473,893

5 Claims. (Cl. 244—82)

The present invention relates generally to control mechanism for airplanes. More particularly the invention relates to that type of airplane control mechanism which comprises a pivotally mounted basic or primary control surface, such as an elevator, rudder or aileron, a hinged boost tab on the trailing portion of the control surface, an actuating lever in the pilot's compartment, and an operating connection for causing the control surface to swing into different angular positions in response to control movements of the actuating lever.

One object of the invention is to provide an airplane control mechanism of this type which is an improvement upon, and has certain inherent advantages over, previously designed mechanisms and is characterized by the fact that the design and construction are such that but a comparatively small force need be applied to the actuating lever to effect deflection or swinging of the control surface, and is additionally characterized by the fact that the airplane with which it is associated is prevented or precluded from performing a maneuver at accelerations above a safe value.

Another object of the invention is to provide an airplane control mechanism of the type under consideration in which the operating connection includes a spring for swinging the control surface in response to shift of the actuating lever in the pilot's compartment, and the boost tab on the trailing portion of the control surface is controlled by a linkage in such manner that it is deflected or swung angularly relatively to the control surface in direct proportion to the amount of deflection of the spring.

A further object of the invention is to provide an airplane control mechanism of the type and character last mentioned in which the spring for swinging the control element upon shift of the actuating element in the pilot's compartment is of the torsional variety and is in the form of a tube which is in coaxial relation with the hinge axis of the basic or primary control surface.

A still further object of the invention is to provide an airplane control mechanism which is generally of new and improved construction and in addition is both simple in design and efficient in operation.

Other objects of the invention and the various advantages and characteristics of the present airplane control mechanism will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 1 is a side view of an airplane having applied to the elevators thereof a control mechanism embodying the invention, parts of the airplane being broken away and other parts being shown in section for purposes of illustration;

Figure 2 is a fragmentary plan view of the airplane shown in Figure 1;

Figure 3 is a fragmentary perspective of the right hand elevator of the airplane illustrating in detail the construction and design of the linkage for controlling the boost tab for the right hand elevator and also showing in detail a portion of the operating connection between the actuating lever in the pilot's compartment of the airplane and the right hand elevator;

Figure 4 is a section showing in detail the manner in which the tube type torsional spring for effecting swinging of the right hand elevator is connected to the torque tube forming a part of the operating connection;

Figure 5 is a section on the line 5—5 of Figure 4;

Figure 6 is a diagrammatic view showing the right hand elevator and its tab in their neutral position;

Figure 7 is a diagrammatic view showing the right hand elevator swung upwards and while subjected to insufficient air resistance to effect deflection of the tube type torsional spring, and illustrating the fact that when the spring is not deflected the boost tab for the right hand elevator remains in its neutral position; and Figure 8 is a diagrammatic view showing the tube type torsional spring deflected in connection with upward swinging of the right hand elevator due to such elevator encountering heavy air resistance and illustrating the manner in which such deflection on the part of the spring results in the linkage swinging the boost tab downwards relatively to the right hand elevator into a position wherein it assists the actuating lever in the pilot's compartment in effecting up swing of the right hand elevator.

The control mechanism which is shown in the drawings constitutes the preferred form or embodiment of the invention. It is illustrated in connection with an airplane A and serves as a medium for controlling swinging or angular deflection of the airplane elevators 9 and 10. The airplane A is of conventional or standard construction and comprises a fuselage $a$ having a motor driven propeller $a^1$ and an empennage E. The empennage is located at the tail or rear end of the fuselage $a$ and comprises in addition to the elevators 9 and 10, a horizontal stabilizer $e$, a vertical stabilizer $e^1$ and a rudder $e^2$. The horizontal stabilizer $e$ projects outwards from opposite sides of the tail end of the fuselage and carries the elevators 9 and 10 at the trailing portion thereof. The elevator 9 is the right hand elevator and is disposed behind the right hand portion of the stabilizer $e$. It is hinged by way of suitable brackets (not shown) to swing up and down and coacts with the elevator 10 to control longitudinal tilting of the airplane A. The elevator 10 is located behind the left hand end of the stabilizer $e$ and, like the elevator 9, is hinged so that it is capable of swinging upwards and downwards. The hinge axes of the two elevators are coaxial and, as hereinafter described, the two elevators are conjointly controlled to swing upwards and downwards in unison. In addition to the fuselage and empennage the airplane A comprises a wing structure $a^2$ constituting its main supporting surface. It also comprises a pilot's compartment $a^3$. The latter is disposed in the central portion of the fuselage $a$ and has a transparent enclosure $a^4$.

The elevator 9 is provided at the trailing portion thereof with a boost tab 11 and comprises an inner or inboard cross rib 12 and an intermediate cross rib 13. It also comprises a suitable skin around the cross ribs. The boost tab 11 is pivotally connected to the trailing portion of the elevator 9 by way of hinges (not shown) and the latter are arranged and designed so as to permit the tab 11 to swing upwards and downwards relatively to the elevator 9. As shown in Figure 3, the hinge axis for the tab 11 is disposed behind the leading edge of the tab. In order dynamically to balance the tab about the hinge axis and thus prevent flutter the leading portion of the tab is counterbalanced by applying weights (not shown) to the inner portion of the leading edge of the tab.

The improved control mechanism includes the elevator 9 as well as the elevator 10 and comprises an actuating lever 14 in the pilot's compartment $a^3$ of the airplane A, a torque tube 15 between the two elevators, a torsional spring 16 for swinging the elevator in response to rocking of the torque tube 15, and a linkage 17 for controlling the boost tab 11. The actuating lever 14 is of the joy stick variety and has the lower end thereof fixed to a horizontal, transversely extending rock shaft 18 in the front, lower portion of the pilot's compartment $a^3$. As hereinafter described, it is adapted when swung forwards to swing the elevator 9 downwards and when swung rearwards to swing the elevator 9 upwards relatively to the horizontal stabilizer $e$ of the empennage E. The rock shaft is suitably supported and embodies an upwardly extending arm 19 and a downwardly extending arm 20. These arms are rigidly connected with the shaft and are preferably longitudinally aligned. The torque tube 15 is in axial alignment to the hinge axis for the elevator 9 and is journalled in suitable bearings in the rear or tail end of the airplane fuselage $a$ so that it is free to rock about its axis. It operates through the medium of the torsional spring 16 to swing the elevator 9 upwards and downwards into different angular positions and has fixedly mounted thereon an upwardly extending arm 21 and a downwardly extending arm 22. The last two mentioned arms are preferably in longitudinal alignment. The torque tube 15 is connected to rock conjointly with the rock shaft 18 by way of a pair of crossed cables 23 and 24. These two cables are disposed within the fuselage of the airplane A and extend between the rock shaft 18 and the torque tube 15. The front end of the cable 23 is connected to the lower end of the arm 20 and the rear end of such cable is connected to the upper end of the arm 21. The cable 24 has the front end thereof connected to the upper end of the arm 21 and the rear end thereof connected to the lower end of the arm 22. As the result of the arrangement of the arms and the two cables the torque tube 15 is caused to rock or turn in a clockwise direction, as viewed in Figure 3, when the rock shaft 18 is rocked in a counterclockwise direction as the result of forward shift of the actuating lever 14. It is also caused to rotate or rock in a counterclockwise direction when the rock shaft 18 is turned or rocked in a clockwise direction in response to rearward shift or swinging of the actuating lever 14 in the pilot's compartment $a^3$. The torsional spring 16 is disposed for the most part in the inner front portion of the elevator 9. It is preferably in the form of a steel tube and is in axial alignment with the torque tube 15 and the hinge axis of the elevator 9. The inner end of the tube type torsional spring 16 projects through a hole in the front portion of the inboard cross rib 12 of the elevator 9 and fits within the adjacent end of the torque tube. A pin 25 extends through the inner end of the spring 16 and said adjacent end of the torque tube and serves fixedly or rigidly to connect together the contiguous ends of the spring and tube. The outer end of the tube type torsional spring 16 is fixedly connected to a bracket 26 on the front portion of the intermediate cross rib 13 of the elevator 9. When the actuating lever 14 is shifted either fore or aft for elevator controlling purposes and the elevator 9 is subjected to negligible or but a slight amount of air resistance the tube type torsional spring 16 remains rigid and hence effects a direct driving connection between the torque tube and the elevator 9. If, however, appreciable resistance is encountered in swinging the elevator 9 by actuation of the lever 14 the tube type torsional spring 16 will deflect or twist and thus result in relative movement between the torque tube 15 and the elevator 9.

The tab 11 serves as a medium for assisting in the movement of the elevator 9. It is automatically controlled by the linkage 17 in such manner that it is deflected relatively to the elevator 9 in proportion to the amount of deflection of the tube type torsional spring 16. The linkage (see Figures 3, 4 and 5) comprises a horn 27, a horn 28, and a push-pull rod 29. The horn 27 is disposed between the inner end of the torsional spring 16 and the adjacent end of the torque tube 15 and extends downwards. The upper portion of the horn 27 is cap screws 30 to a right angle flange adjacent end of the torque tube and h.. 32 therein through which the inner end of .. tube type torsional spring extends loosely. By reason of the fact that the horn 27 is fixedly connected to the torque tube 15 it rocks therewith in response to control movements of the actuating lever 14 in the pilot's compartment $a^3$ of the airplane A. The horn 28 is associated with the boost tab 11 and extends upwards. The lower end of the horn 28 is fixedly secured to the tab with the result that the tab is caused to swing relatively to the elevator 9 in response to swinging of the horn 28. The push-pull rod 29 is disposed inwards of the inboard cross rib 12 of the elevator 9 and extends between the two horns. The front end of the rod is connected by a pivot pin 33 to the lower end of the horn 27 and the rear end of the rod 29 is connected by a pivot pin 34 to the upper end of the horn 28. The boost tab 11 is normally positioned in a neutral position with respect to the elevator 9 and remains in such position unless, in connection with swinging of the elevator, there is relative movement between the torque tube 15 and the elevator due to deflection or twisting of the torsional spring 16. In the event the torque tube 15 rotates relatively to the elevator 9 in connection with swinging of the latter the linkage 17 operates to deflect the boost tab 11 so that it assists in swinging of the elevator. The linkage 17 is so arranged or designed that should there be relative movement of the torque tube 15 and the elevator 9 in connection with upward swinging of the elevator the boost tab 11 swings downwards relatively to the elevator (see Figure 8). It is also so arranged or designed that in the event the torsional spring 16 deflects in connection with downward swinging of the elevator 9 and resultant turning of the torque tube 15 relatively to the elevator the boost tab 11 is caused to swing upwards relatively to the elevator. The amount of deflection or angular swinging of the boost tab relatively to the elevator 9 is directly proportioned to the amount of deflection of the tube type torsional spring 16. It is thus manifest that the assistance of the boost tab, so far as swinging of the elevator 9 is concerned, is proportional to the force which is applied to the actuating lever 14 and such force in turn is directly proportional to the resisting hinge moment of the elevator 9. Should the actuating lever 14 be pulled rearwards with appreciable force with a view of swinging the elevator 9 upwards while the latter is subjected to appreciable air resistance the tube type torsional spring 16 is subjected to a comparatively large amount of deflection with the result that the boost tab 11 is swung or angularly adjusted downwards relatively to the elevator 9 an appreciable amount and thus assists to a major degree upward swinging of the elevator. As previously pointed out, the movement of the boost tab 11 is proportional to the force applied on the actuating lever 14 by the pilot of the airplane A.

An arm 35 is formed integrally with, and projects upwards from, the upper end of the horn 27. In order to limit the amount of deflection of the tube type torsional spring 16 and the amount of deflection or swinging movement of the boost tab 11 relatively to the elevator 9 an upper pair of adjustable stop screws 36 and a lower pair of adjustable stop screws 37 are provided. These screws are carried by a bracket 38 which is bolted or otherwise fixedly secured to the front portion of the inboard cross rib 12 of the elevator 9. The central portion of the bracket has a circular aperture 39 therein through which the torsional spring 16 extends loosely. The upper portion of the bracket embodies a horizontally elongated part 40 and this is provided with a pair of spaced apart inwardly extending lugs 41. The latter are in straddled relation with the upper end of the arm 35 and have coaxial threaded bores for the shanks of the upper stop screws 36. Such screws are arranged so that the heads thereof are opposite the upper end of the arm 35 and form stops for limiting rocking of the arm 35, the horn 27 and the torque tube 15 relatively to the elevator 9. Lock nuts 42 are mounted on the shanks of the upper screws 36 and serve to lock the screws in their various adjusted positions. By loosening the lock nuts the screws may be adjusted outwards or inwards in order to increase or decrease the amount of deflection of the torsional spring 16 and the amount of deflection of the boost tab 11 relatively to the elevator 9. The lower portion of the bracket 38 is provided with a horizontally elongated part 43 and this is provided with a pair of spaced apart inwardly extending integral lugs 44. The latter have internally threaded sockets for the shanks of the lower stop screws 37 and are positioned in straddled relation with the central portion of the horn 27. The set screws are arranged so that the heads thereof are disposed inwardly and form stops for the horn 27. The latter embodies at the central portion thereof a pad 45 having flat surfaces for abutment against the heads of the lower stop screws 37. Lock nuts 46 on the shanks of the lower stop screws 37 serve to hold such screws in their various adjusted positions. The screws 37 augment the stopping or limiting action of the upper screws 36. When the upper and lower stop screws are adjusted outwards with respect to the arm 35 and the horn 27 the amount of turning movement of the torque tube 15 relatively to the elevator 9 is increased and the amount of deflection of the boost tab 11 with respect to the elevator is correspondingly increased. Inward adjustment of the stop screws, that is, adjustment of the screws toward the arm 35 and the horn 27 restricts rotative movement of the torque tube relatively to the elevator 9 and correspondingly decreases the amount of deflection or angular adjustment of the boost tab 11 with respect to the elevator. In addition to limiting the amount of deflection of the torsional spring 16 relatively to the elevator 9 the stop screws 36 and 37 form a driving connection between the torque tube 15 and the elevator in the event of failure of the torsional spring. Such driving connection, although it is of the lost motion variety, does actually, however, permit angular displacement of the elevator by the airplane operator in the event of breakage, fracture or failure of the torsional spring. The stop screws 36 and 37 also serve to prevent maneuvering of the airplane at accelerations above a safe value. When the actuating lever 14 is shifted to produce elevator deflection, the torsional spring is deflected in proportion to the elevator resistance. Also, when the airplane is traveling at speeds capable of producing dangerous normal accelerations, the resistance of the elevator to deflection is substantially proportional to the acceleration produced by the deflection. Hence, the torsional deflection of the spring will be substantially proportional to the acceleration produced when the elevator 9 is deflected by moving the lever 14. The stop screws 36 and 37 may be then adjusted so that at any desired acceleration of the airplane, they will prevent any further torsion in the torsional spring 16, thereby preventing the boost tab 47 from giving any further aid in reducing the hinge moment of the elevator 9. Therefore, the airplane operator will find that he can obtain accelerations in the airplane with a relatively light force on the actuating lever 14 up to that acceleration at which the stops 36 and 37 are reached, but that a relatively large force will be necessary to produce any greater acceleration, thus preventing accelerations greater than desired.

The left hand elevator 10 embodies a hinged boost tab 47 along its trailing margin. It is operatively connected to the torque tube 15 by way of a tube type torsional spring 48. The latter is similar in design, construction and operation to the tube type torsional spring 16 for the right hand elevator 9 and has the inner end thereof fixed to the adjacent end of the torque tube and its outer end fixed to one of the intermediate cross ribs of the elevator 10. The boost tab 47 is controlled similarly to the boost tab 11 by way of a linkage 49. The latter is like, and functions in the same manner as, the linkage 17 for controlling the boost tab 11.

The operation of the improved control mechanism is as follows:

When it is desired to swing the elevators 9 and 10 upwards the actuating lever 14 in the pilot's compartment of the airplane is swung rearwards. This control movement on the part of the actuating lever operates through the medium of the arms 19, 20, 21 and 22 and the crossed cables 23 and 24 to rock the torque tube 15 in a counterclockwise direction, as viewed in Figure 3. In the event that the elevators are subjected to insufficient resistance to cause deflection of the tube type torsional springs 16 and 48 counterclockwise rotation of the torque tube results in corresponding and conjoint upward swing of the two elevators. In the event that the elevators in connection with upward swing thereof encounter resistance sufficient to effect deflection or twisting of the torsional springs the torque tube 15 rotates relatively to the elevators with the result that the linkages 17 and 49 operate to swing the two boost tabs downwards relatively to the elevators. As soon as the boost tabs are swung downwards relatively to the elevators the air-flow thereover creates a hinge moment tending to force upwards the elevators. In this manner the boost tabs assist in effecting up-swing of the elevators in connection with rearward swinging of the actuating lever 14. As previously pointed out, the amount of downward deflection of the boost tabs relatively to the elevators is determined by the force which is applied to the actuating lever 14 and such force is proportional to the resisting hinge moment of the elevators. When it is desired to lower the elevators 9 and 10 in order to effect dive maneuver on the part of the airplane A the actuating lever is swung forwards. This results in the torque tube 15 rocking or rotating in a clockwise direction as viewed in Figure 3. If the resistance encountered by the elevators is insufficient to deflect the torsional springs 16 and 48 the two elevators swing downwards in direct proportion to the rotative movement of the torque tube and the rearward swing of the actuating lever and the boost tabs remain in their neutral position. In the event that the elevators, in connection with downward swing thereof, encounter resistance sufficient to cause deflection of the tube type torsional springs, the torque tube 15 rotates relatively to the elevators and results in the linkages 17 and 49 causing the boost tabs to swing upwards relatively to the elevators. Upward swing or deflection of the boost tabs results in the tabs assisting to swing the elevators downwards.

The herein described control mechanism is essentially simple in design and construction and effectively and efficiently fulfills its intended purpose. It enables the elevators to be controlled by the application of but a small force on the actuating lever in the pilot's compartment and in addition prevents or precludes the airplane from performing a maneuver at accelerations above a safe value.

Whereas the mechanism has been described in connection with the control of the elevators of an airplane it is to be understood that it may be used equally as well in connection with the control of a control surface such as a rudder or an aileron. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. Flight control mechanism for an airplane, comprising a pivotally supported control surface with a hinged boost tab thereon, means for swinging the control surface for airplane maneuvering purposes, comprising an element mounted to rotate about an axis in coaxial relation with the pivot axis of the control surface, and an elongated torsional spring in concentric relation with said pivot axis of the control surface, having one end thereof fixedly connected to the element and its other end fixedly connected to said control surface, and adapted when the element is rotated while the control surface is subjected to low air resistance to swing said control surface conjointly with the element and further adapted when the element is rotated while the control surface is subjected to high air resistance to permit said element to rotate relatively to the control surface, and means operative in response to rotation of the element relatively to the control surface to tilt the tab into a position wherein it serves to assist in swinging the control surface.

2. An airplane flight control mechanism comprising a pivotally supported control surface with a hinged boost tab thereon, means for swinging the control surface for airplane maneuvering purposes, comprising an element mounted to rotate about an axis in coaxial relation with the pivot axis of the control surface, and a torsional spring in the form of a metallic tube mounted in coaxial relation with said pivot axis of the control surface, having one end thereof connected fixedly to the element and its other end connected fixedly to the control surface, and adapted when the element is rotated while the control surface is subjected to low air resistance to swing said control surface conjointly with the element and further adapted when the element is rotated while the control surface is subjected to high air resistance to permit said element to rotate relatively to the control surface, and a linkage between the element and the tab operative in response to rotation of the element relatively to the control surface to tilt the tab into a position wherein it serves to assist in swinging the control surface.

3. Airplane flight control mechanism comprising a pivotally supported control surface with a hinged boost tab thereon, means for swinging the control surface for airplane maneuvering purposes, comprising a torque tube rotatably mounted in coaxial relation with the pivot axis of the control surface, and a single tube type torsional spring arranged in coaxial relation with the tube and extending between, and connected to, said tube and control surface, and a linkage between the torque tube and the tab operative automatically to tilt the tab relatively to the control surface when the torque tube rotates relatively to the control surface due to deflection of the torsional spring.

4. Airplane flight control mechanism comprising a pivotally supported control surface with a hinged boost tab thereon, means for swinging the control surface for airplane maneuvering purposes, embodying an element mounted to rotate about an axis in coaxial relation with the pivot axis of the control surface, an elongated torsional spring in concentric relation with said pivot axis of the control surface, having one end thereof fixedly connected to the element and its other end fixedly connected to said control surface, and adapted when the element is rotated while the control surface is subjected to low air resistance to swing said control surface conjointly with the element and further adapted when the element is rotated while the control surface is subjected to high air resistance to permit said element to rotate relatively to the control surface, a linkage between the element and the tab operative in response to rotation of the element relatively to the control surface to tilt the tab into a position wherein its assists in swinging the control surface, and including a horn on the element, and adjustable stop means mounted on the control surface and adapted to coact with the horn to limit rotation of the element relatively to said control surface.

5. Flight control mechanism adapted for use in connection with an airplane and comprising a pivotally supported control surface with a hinged boost tab thereon, means for swinging the control surface, embodying a torque tube mounted to rotate on an axis in coaxial relation with the pivot axis of the control surface, and an elongated torsional spring in coaxial relation with said pivot axis of the control surface, having one end thereof fixedly connected to the torque tube and its other end fixedly connected to the control surface, adapted when the torque tube is rotated while the control surface is subjected to low air resistance to swing said control surface conjointly with the torque tube and further adapted when the torque tube is rotated while the control surface is subjected to high air resistance to permit said torque tube to rotate relatively to said control surface, a linkage between the torque tube and the tab operative in response to rotation of the torque tube relatively to the control surface to tilt the tab with respect to the surface into a position wherein it serves to assist in swinging said surface, and including a horn on the torque tube, and adjustable stops mounted on the control surface in straddled relation with the horn and arranged so that they coact with the horn to limit rotation of the torque tube relatively to said control surface.

FRANK W. DAVIS.